United States Patent [19]

Tanaka et al.

[11] Patent Number: 5,056,913
[45] Date of Patent: Oct. 15, 1991

[54] OPTICAL GAUGING APPARATUS

[75] Inventors: Hirokazu Tanaka; Kiyomitsu Ishikawa, both of Tokyo; Fumio Ogawa, Kanagawa, all of Japan

[73] Assignee: Stanley Electric Corporation, Tokyo, Japan

[21] Appl. No.: 578,083

[22] Filed: Sep. 5, 1990

[30] Foreign Application Priority Data

Sep. 21, 1989 [JP] Japan ............................ 1-243517
Oct. 20, 1989 [JP] Japan ............................ 1-271487
Jun. 5, 1990 [JP] Japan ............................ 2-145345
Jun. 5, 1990 [JP] Japan ............................ 2-145346
Jun. 12, 1990 [JP] Japan ............................ 2-151652

[51] Int. Cl.$^5$ .............................................. G01C 3/08
[52] U.S. Cl. ...................................... 356/4; 356/364; 356/369; 250/225
[58] Field of Search ............... 356/1, 4, 5, 364, 369; 250/225, 561

[56] References Cited

U.S. PATENT DOCUMENTS

| | | | |
|---|---|---|---|
| 4,639,140 | 1/1987 | Lerat | 356/4 X |
| 4,657,382 | 4/1987 | Busujima et al. | 356/4 |
| 4,673,817 | 6/1987 | Oomen | 250/561 |
| 4,908,508 | 3/1990 | Dubbeldam | 356/369 X |
| 4,954,861 | 9/1990 | Nagaoka et al. | 356/4 X |

Primary Examiner—Linda J. Wallace
Attorney, Agent, or Firm—Spensley Horn Jubas & Lubitz

[57] ABSTRACT

An optical gauging apparatus utilizing a light projected toward an object to be gauged and reflected on the object to gauge a distance to the object or an amount of change occurring in the object. The gauging apparatus includes light projecting elements adapted to project two light beams from first and second light sources or split from the light of a single light source toward the object so that these two light beams provide the object with respective different luminance characteristics thereon, a light receiving member adapted to receive the light reflected on the object, and a signal processor adapted to calculate a ratio of different luminances for the two light beams from the ouptut of the light receiving member and thereby to output an information on the gauged result.

10 Claims, 11 Drawing Sheets

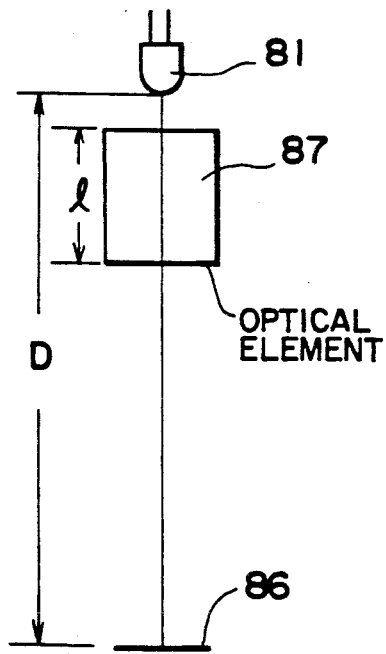
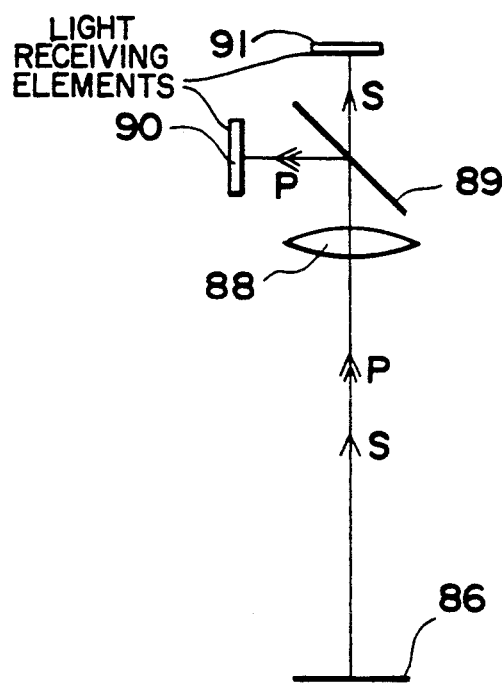
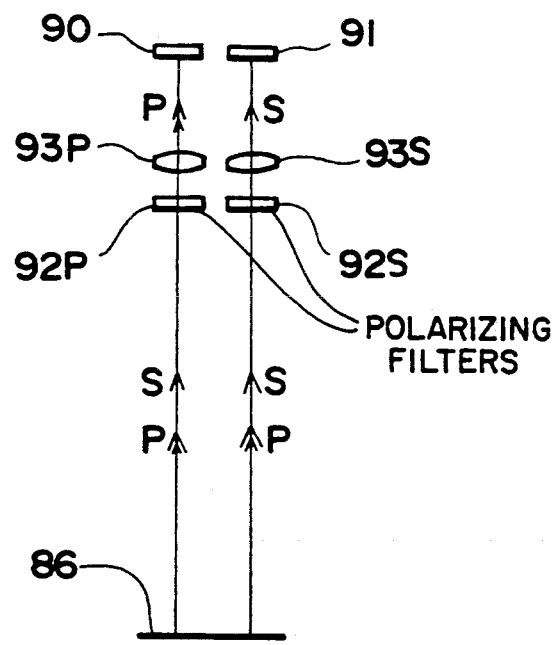

OPTICAL GAUGING APPARATUS

BACKGROUND OF THE INVENTION

1. Field of the Invention

The present invention relates to an optical gauging apparatus utilizing the light reflected on an object to be gauged and being useful for car level gauging, spring deflection gauging, photographic distance gauging, etc.

2. Background Art

There have already been proposed various gauging apparatuses utilizing the reflected light on an object to be gauged, an example of which is schematically shown by FIG. 24 of the accompanying drawings.

This example of prior art is a distance gauging apparatus for photographic camera and based on the principle of triangulation as illustrated. With this gauging apparatus, the light emitted from a light source 1 comprising a light emitting diode is condensed by a light projecting lens 2 and then projected onto an object 3 to be photographed.

The light reflected on the object 3 is condensed by a light receiving lens 4 and then focussed on a predetermined location of a light receiving element 5 such as PSD (Poositon Sensing Device) or CCD. Consequently, a light receiving angle $\theta_1$ depends on a position of the object 3 and a distance Do to the object 3 is determined from said light receiving angle $\theta_1$, in relation to preselected light projecting angle $\theta_2$ and inter-lens distance l.

In the case of the above-mentioned gauging apparatus shown by FIG. 24, a light spot focussed on the light receiving element 5 is preferably as small as possible and, to achieve this, high optical properties are required for respective parts such as the light source 1, the light projecting lens 2 and the light receiving lens 4.

In the case of a short-distance gauging, the light receiving angle $\theta_1$ is necessarily reduced but here again it is essential to focus a light image of the object 3 as sharply as possible on the light receiving element 5. To meet such requirement, a wide angle lens having a large image circle must be employed as the light receiving lens 4. This leads to an increased cost and requires high mechanical precision for the light receiving angle $\theta_1$, the light projecting angle $\theta_2$, the inter-lens distance l, etc.

A distance from the light source 1 to the light projecting lens 2 must be adjusted for sharply focussing the light image of the light source 1 on the object 3 and similarly a distance from the light receiving lens 4 to the light receiving element 5 must be also adjusted for sharply focussing the light image of the object 3 on the light receiving element 5. A mechanism for such adjustment is inevitably complicated.

Another example of prior art illustrated by FIG. 25 is a gauging apparatus generally incorporated, as one of active features, into the auto-focussing mechanism for photographic camera. In this apparatus, an object 8 to be photographed is illuminated by the light projected from a light source 6 such as a light emitting diode. The light reflected on the object 8 is received by a light receiving element 7 such as a photodiode. A light receiving level of the light receiving element 7 (i.e., intensity of the reflected light) is detected and a distance Do to the object 8 is determined from the detected value.

The gauging apparatus of FIG. 25 is often disadvantageously affected by a particular environment in which the projected light is reflected on the object 8.

Specifically, an object 8 having a dark surface presents the light receiving level different from that which an object 8 having a bright surface presents, because these objects 8 having different surfaces have correspondingly different reflection factors. Also when the light source 6 has its light emitting surface contaminated or the light receiving element 7 has its light receiving surface contaminated, the intensity of the emitted light or the light receiving level respectively varies.

Thus the light receiving sensitivity is affected by various conditions such as uniform reflection factor and contaminated surface of the object 8, or contaminated surface of the light source 6 or the light receiving element 7, making it difficult to gauge an accurate distance.

SUMMARY OF THE INVENTION

A first object of the invention is to develop an optical gauging apparatus simplified in construction but significantly improved in gauging ability without demand for parts of high optical properties as well as high mechanical precision.

A second object of the invention is to develop an optical gauging apparatus providing a high gauging accuracy free from conditions such as uniform reflection factor and contaminated surface of an object to be gauged, or contaminated surface of the light receiving element or the light source.

The first and second objects set forth above are achieved, in accordance with the invention, by an optical gauging apparatus comprising light projecting means adapted to illuminate an object to be gauged using first and second light sources so that a luminance on the object under illumination by the first light source differs from a luminance on the same object under illumination by the second light source; light receiving means adapted to receive and photoelectrically convert the light projected from these two light sources, separately for the respective light sources; and a signal processor adapted to calculate a ratio of luminances on the object caused by said first and second light sources, respectively, from output signals of said light receiving means and thereby to output an information on an amount of change occurring in the object or a distance thereto.

The first and second objects of the invention are achieved also, in accordance with the invention, by an optical gauging apparatus comprising light projecting means adapted to split the light coming from a single light source into two light components of different optical natures and to illuminate an object to be gauged with said two light components of optical path lengths being different from each other; light receiving means adapted to receive and photoelectrically convert the light reflected on the object separately for the respective light components; and a signal processor adapted to compare photoelectric conversion signals for the respective light components output from said light receiving means and thereby to output an information on an amount of change occurring in the object or a distance thereto.

BRIEF DESCRIPTION OF THE DRAWINGS

FIGS. 1 through 8 illustrate a first embodiment of the invention, in which:

FIG. 1 is a diagram illustrating a principle of the invention,

FIG. 2 is a characteristic graphic diagram showing illuminances on an object to be gauged under illumination by the light projected from a point light source and a surface light source, FIG. 3 is a characteristic graphic diagram showing a ratio of illuminances between the point light source and the surface light source, FIG. 4 is a diagram schematically showing light projecting means and light receiving means, FIG. 5 is a circuit diagram of a signal processor, FIG. 6 is a circuit diagram of a logarithmic converter, and FIGS. 7 and 8 are schematic diagrams showing a variant of the said first embodiment;

FIGS. 9 through 12 illustrate a second embodiment of the invention, in which:

FIG. 9 is a schematic diagram showing the light projecting means and the light receiving means, FIG. 10 is a block diagram showing an example of the signal processor, FIG. 11 is a characteristic graphic diagram showing illuminances on the object, and FIG. 12 is a schematic diagram showing a variant of the second embodiment; FIGS. 13 through 15 illustrate a third embodiment of the invention in which:

FIG. 13 is a schematic diagram showing the light projecting means and the light receiving means, FIG. 14 is a schematic diagram showing a variant of the third embodiment, and FIG. 15 is an optical system diagram showing an optical nature of the lens;

FIGS. 16 through 19 illustrate a fourth embodiment of the invention, in which:

FIGS. 16 and 17 schematically show the light projecting means, and

FIGS. 18 and 19 schematically show the light receiving means; and

FIGS. 20 through 23 illustrate a fifth embodiment of the invention, in which:

FIG. 20 schematically shows the light projecting means,

FIG. 21 is a diagram illustrating a relationship between a hyperboloidal mirror and a focus, FIG. 22 is a diagram illustrating the light receiving means, and FIG. 23 is a schematic diagram showing a variant of the fifth embodiment.

DESCRIPTION OF THE PREFERRED EMBODIMENTS

A first embodiment will be described by way of example in reference with the accompanying drawings.

Figure 1:
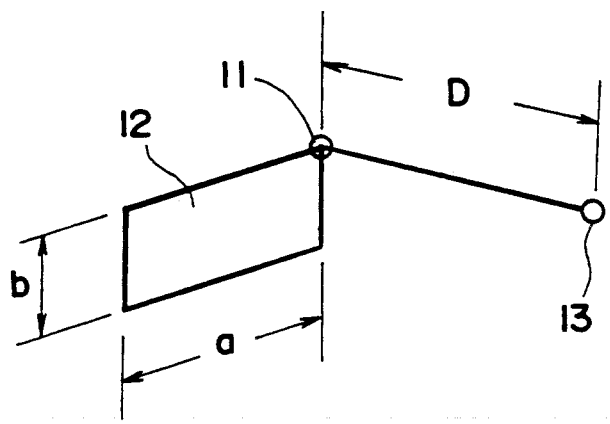
Figure 2:
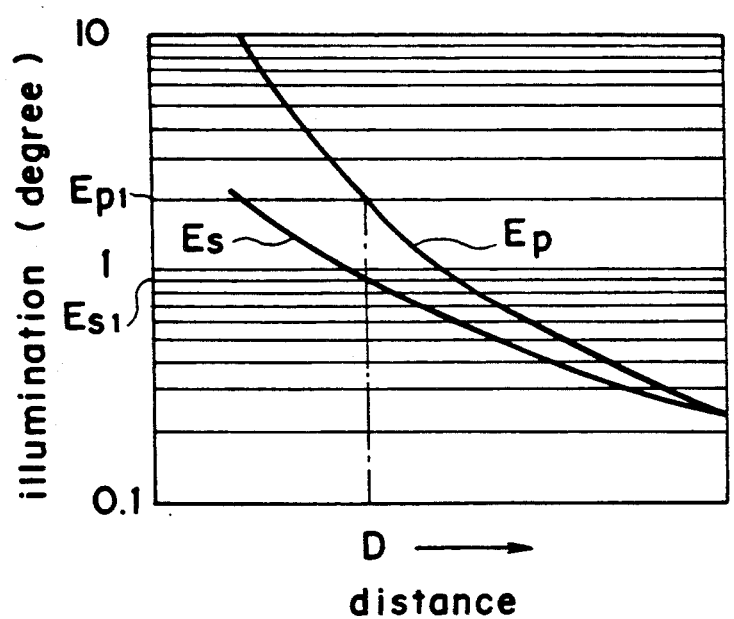

FIG. 1 illustrates a basic principle of the gauging apparatus constructed according to the invention, in which a reference numeral 11 designates a point light source located at a corner of a surface light source 12. An intensity of the light emitted from said point light source 11 is attenuated in inverse proportion to a square of the distance from said point light source 11 and exhibits an optical characteristic curve Ep as indicated in FIG. 2.

Such square rule is not applicable to the light emitted from the surface light source 12 and an attenuation ratio of the light with respect to the distance depends on a particular area of the surface light source 12. In the present embodiment, the surface light source 12 has a behaviour as represented by an optical characteristic curve Es in FIG. 2. It should be understood that the surface light source 12 illustrated in FIG. 1 is a rectangular diffusive surface light source dimensioned $a \times b = 500$ mm $\times 100$ mm.

An object 13 to be gauged perpendicularly spaced from said corner of the surface light source 12 by a distance D cm has illuminances $Ep_1$, $Es_1$ under illuminating effects from the point light source 11 and the surface light source 12, respectively, and, in consequence, surface luminances (nits) of the object 13 corresponds to $\rho Ep_1$ and $\rho Es_1$, respectively, where $\rho$ represents a reflection factor of said object 13.

Ratio of these surface luminances $Ep_1/Es_1$ is a value independent of the reflection factor $\rho$ of the object 13.

Figure 3:
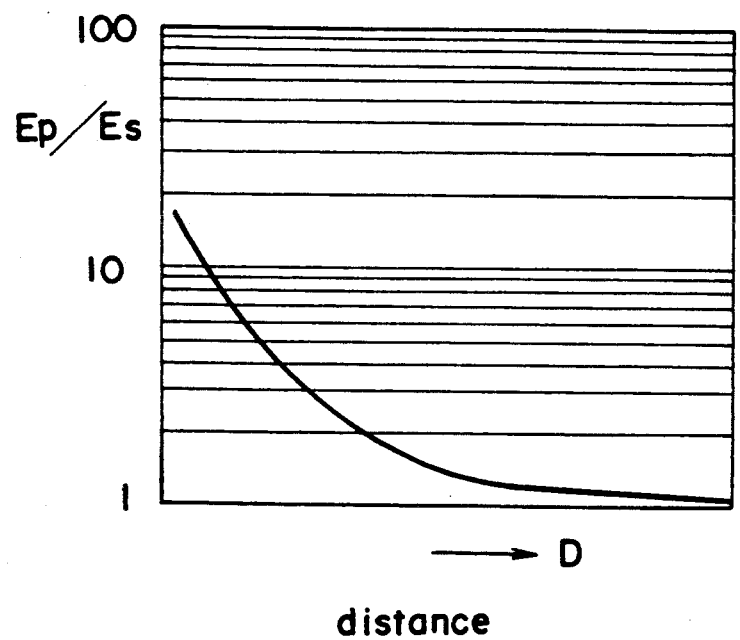

FIG. 3 shows a characteristic curve representing such ratio of the surface luminances (EP/Es). As will be apparent from this characteristic curve, such surface luminance ratio varies as a function of the distance and this ratio may be determined to obtain a desired information on the distance of the object 13 from the light source.

While the distance information as mentioned above can be numerically calculated by a computer after the surface luminance of the object 13 has been measured and then the measured value has been digitally converted, such method would disadvantageously require a complicated apparatus and could not provide an analoge information.

The instant embodiment provides, in view of a fact that a short-circuit current of the semiconductor photoconductive element linearly responds to the incident light on a light receiving surface, an arrangement as will be described below.

Light reflected on the object 13 is received by photoconductive elements such as photodiodes which then output a photoelectrically converted current Ip corresponding to the reflected light resulting from illumination by the point light source 11 and a photoelectrically converted current Is corresponding to the reflected light resulting from illumination by the surface light source 12, respectively.

These two photoelectrically converted currents Ip, Is may be converted by suitable means to voltages Vp, Vs corresponding to respective surface luminances on the object 13, respectively. Namely, a relationship of $Ep/Es \propto Vp/Vs$ is established. On the assumption of $Vp/Vs = R$, both sides of this equation are converted into the respective logarithms as follows:

$$\log(Vp/Vs) = \log R$$

$$\log Vp - \log Vs = \log R.$$

From this equation, a value of log R is calculated. The value of log R is a function of the distance and, therefore, it is possible to obtain a distance D to the object 13 as an analogue information based on said value of log R.

Figure 4:
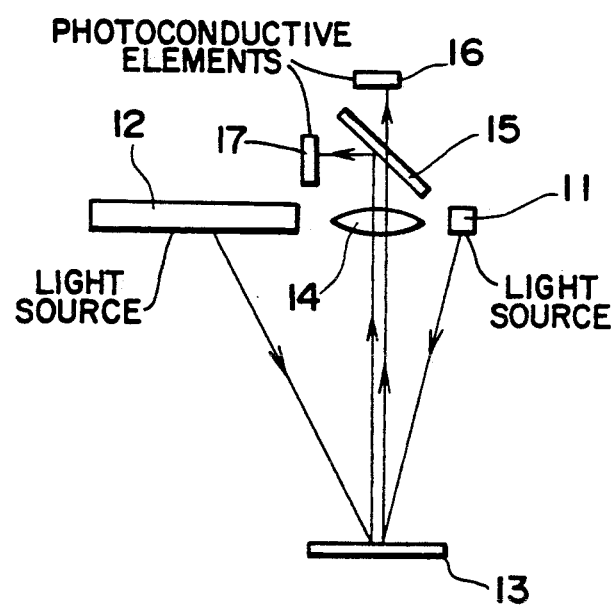
Figure 5:
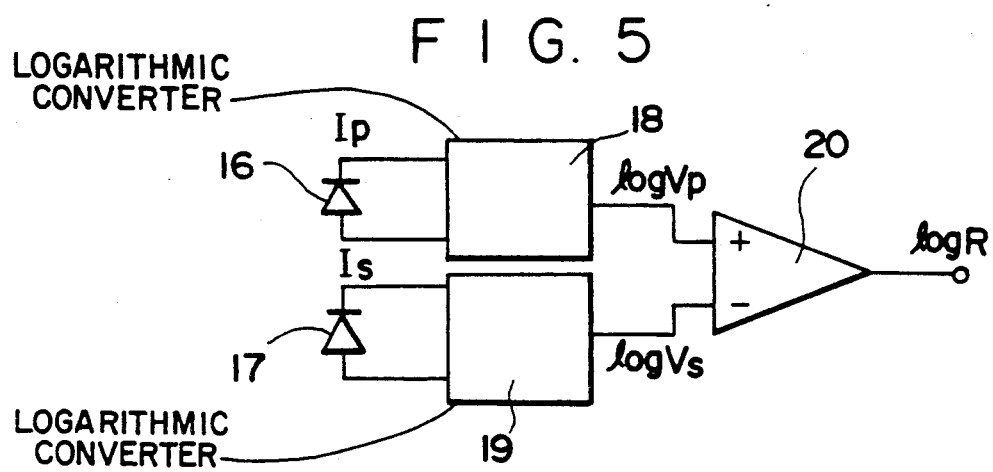

FIGS. 4 and 5 are schematic optical system diagram and circuit diagram illustrating the embodiment of the invention constructed according to the principle as has been mentioned above. In this embodiment, a point light source 11 comprising, for example, a light emitting diode provided illumination at a wavelength of 850 nm while a surface light source 12 provides illumination at a wavelength of 950 nm. The surface light source 12 comprises circuit substrate carrying a plurality of light emitting diodes arranged in matrix so as to provide a large light emitting surface. Alternatively, this surface light source 12 may be implemented by using electroluminescence (EL) elements, fluorolucent (FL) elements, etc.

Reflected light on the object 13 illuminated by the point light source 11 and the surface light source 12 is condensed by a condenser 14 and then divided by a dichroic mirror 15 into the reflection light of 850 nm going straight through the mirror 15 onto a photoconductive element 16 and the reflection light of 950 nm is reflected by the mirror 15 onto a photoconductive element 17.

As seen in the signal processor circuit diagram of FIG. 5, the photoconductive elements 16, 17 comprise photodiodes, respectively, of which the output currents Ip, Is are input to logarithmic converters 18, 19, respectively.

The logarithmic converters 18, 19 are adapted to convert said output currents Ip, Is to voltages Vp, Vs, respectively, and thereafter to convert these voltages Vp, Vs logarithmically. The logarithmically converted voltages Vp, Vs are input to a differential amplifier 20 which, in turn, calculates a differential voltage and thereby outputs an analogue information on a distance to the object 13 according to the equation log Vp−log Vs=log R.

Figure 6:
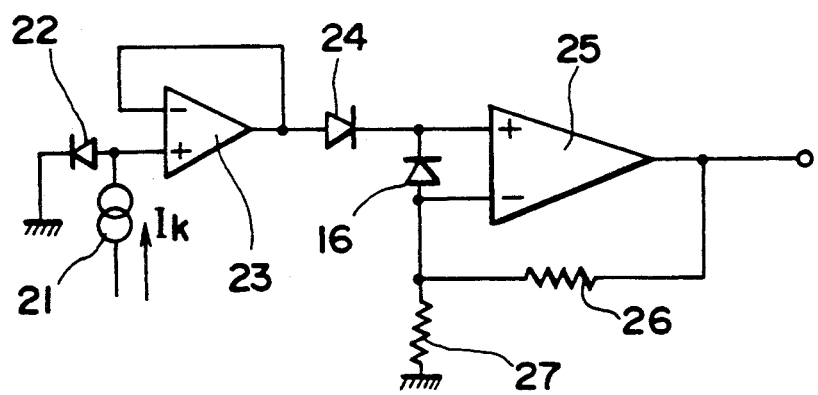

FIG. 6 is a circuit diagram showing an example of said logarithmic converter 18, in which a diode 22 is supplied from a constant corrent source 21 with a current Ik and a voltage generated in this diode 22 is applied through an operational amplifier 23 to a long diode 24 to compensate a thermal characteristic of a forward current specific to the log diode 24.

The current flowing though the log diode 24 is controlled by the photoconductive element 16 so that the voltage generated in the log diode 24 is logarithmically converted before input to an operational amplifier 25.

The operational amplifier 25 provides, under a voltage gain by resistors 26, 27, a logarithmically converted voltage to the differential amplifier 20. It should be understood that the logarithmic converter 19 is identical to said logarithmic converter 20 in construction.

In the case of the above-mentioned logarithmic converters 18, 19, the voltage Vp, Vs converted from the respective output currents Ip, Is of the photoconductive elements 16, 17 are thereby log-compressed and these log-compressed voltages exhibit their vowltage characteristics which are linear with respect to logarithms of luminances on the light receiving surface.

Since the same voltage characteristics are obtained when the voltages of the photoconductive elements 16, 17 are used as open voltages, the logarithmic converters 18, 19 will be unnecessary when the open voltages of the respective photoconductive elements 16, 17 are utilized.

Figures 7, 8:
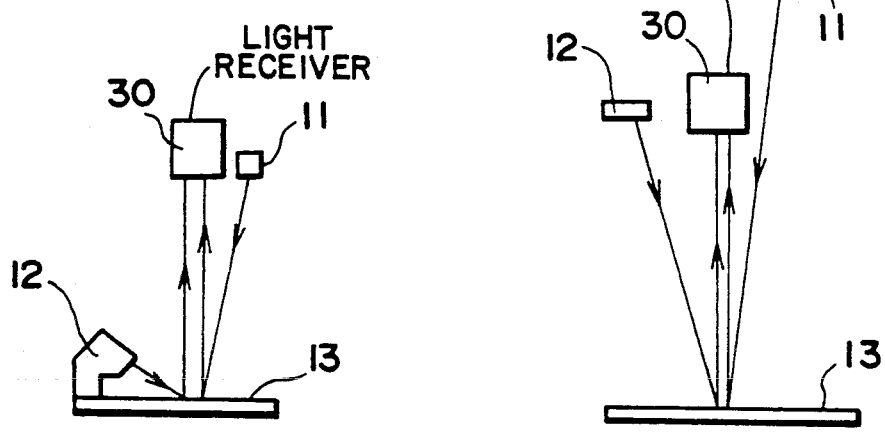

In the first embodiment as has been described, it is also possible that a pair of point light sources 11, 12 are located at different distances from the object to be gauged as illustrated by FIG. 7 or the light source 12 is located adjacent to and integrally with the object 13 as illustrated by FIG. 8, so far as these two light sources are adapted to have their optical characteristics varying depending on their distances to the object 13. In FIGS. 7 and 8, light is reflected from object 13 to a receiver 30.

It is also possible to perform gauging in time series, i.e., alternatively for one of these two light sources that is being activated to project the light or in the light projected by these two light sources being selectively modulated, if desired.

There may be also provided light projecting means including a pair of point light sources located at a same distance but the one light source being located so as to project the light over a wide angle and the other light source being located so as to project project the light over a narrow angle, with respect to the object 13 to be gauged.

Now a second embodiment of the invention will be described.

Figure 9:
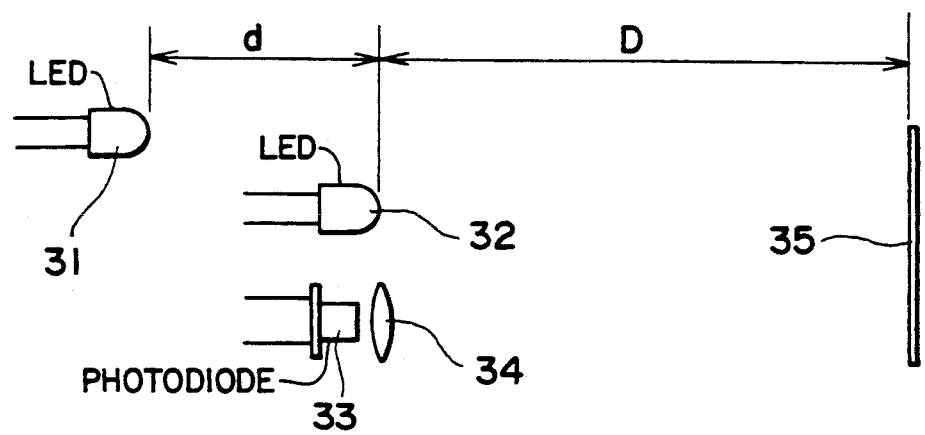

FIG. 9 shows light projecting means and light receiving means. The light projecting means comprises a pair of LEDs or the like serving as first and second light sources 31, 32, respectively, having optical path lengths different from each other by an amount of d. The light receiving means comprises a photodiode or the like serving as a light receiving element 33 and a light receiving lens 34. Reference numeral 35 designates an object to be gauged having a diffusive reflection surface.

The light projected by said pair of light sources 31, 32 illuminates the object 35 and the light reflected on the object 35 is condensed by the light receiving lens 34 before its incidence onto the light receiving element 33.

Then, a principle on the basis of which a distance D to be gauged is calculated will be discussed.

Illuminance $E_1$ of the object 35 under the illuminating effect of the first light source 31 is expressed by $$E_1 = I/(d+D)^2 \tag{1}$$

where I represents an emanating power of the first light source 31. If a reflection factor of the object 35 is represented by $\rho$, a luminance $B_1$ of this object 35 is proportional to $\rho E_1$ and a following equation is established:

$$B_1 = k\rho E_1 \tag{2}$$

where k represents a proportional constant. This proportional constant k will be given an equation (3) if the object 35 comprises a perfect diffusive surface.

$$k = 1/\pi \tag{3}$$

Figure 11:
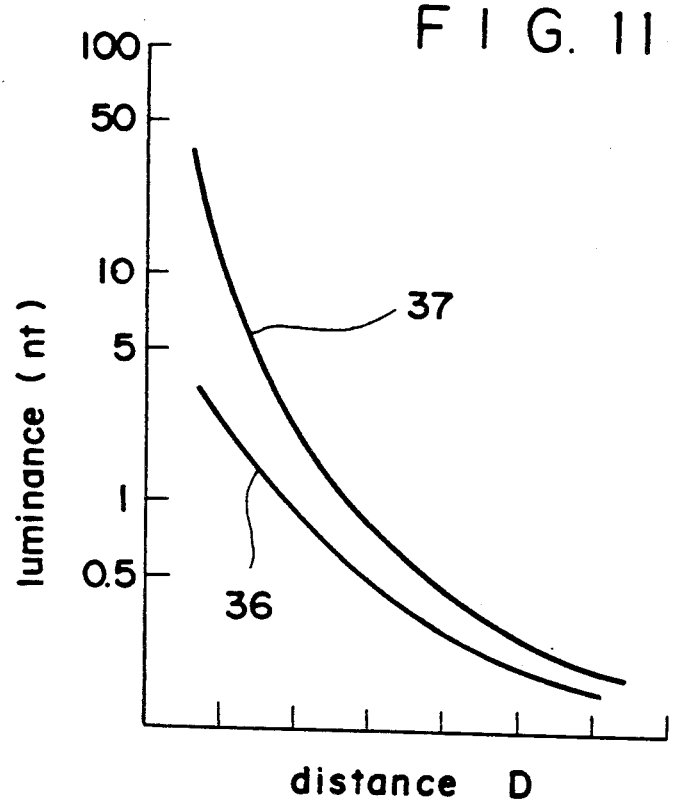

A relationship established between the distance D to be gauged and said luminance $B_1$ is represented by a curve 36 in FIG. 11.

Similarly, for the second light source 32, $$E_2 = I/D^2 \tag{4}$$

$$B_2 = k\rho E_2 \tag{5}$$

A relationship established between the distance D to be gauged and the luminance $B_2$ is represented by a curve 37 in FIG. 11.

The reflected light passes through the light receiving lens 34 onto the light receiving element 33. Based on a ratio of the luminances $B_1$, $B_2$ detected in this manner, the distance D to be gauged is calculated by $$B_2/B_1 = \frac{kpI/D^2}{kpI/(d+D)^2} \qquad (6)$$
$$= \frac{(d+D)^2}{D^2}$$

As will be apparent from the equation (6), the value of D can be obtained from the constant d and the luminance ratio $B_2/B_1$ independently of the reflection factor as well as the proportional constant k.

When this gauging apparatus is used only to determine whether the object 35 is at a distance longer or shorter than a predetermined distance, a variable C corresponding to this distance may be introduced and thereby it may be determined which of $CB_1$ and $B_2$ is larger than the other.

More specifically, assumed that $CB_1 = B_2$ at a predetermined distance Dc, $CBo_1 > B_2$ if the distance D to be gauged is longer than DC and $CB_1 < B_2$ if the distance D is shorter than DC.

Figure 10:
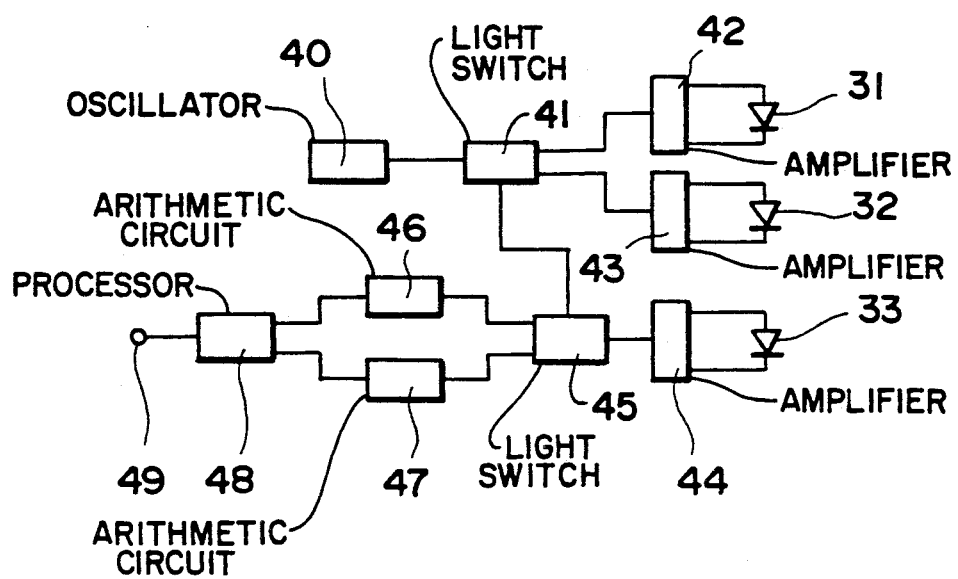

FIG. 10 shows by way of example a signal processor in this second embodiment, in which output pulses of an oscillator 40 are transferred through a light projection change-over device 41 alternately to a first amplifier 42 and a second amplifier 43. In response to said output pulses, said light projection change-over device 41 provides also a synchronizing signal to a light receiving change-over device 45 for timing control of light receiving.

The first amplifier 42 and the second amplifier 43 respectively amplify the output pulses of the oscillator 40 to activate the first light source 31 and the second light source 32, respectively.

The light reflected on the object 35 under such illumination provided from any one of said first and second light sources 31, 32 is received and photoelectrically converted by the light receiving element 33 which then outputs a light receiving signal. This signal is amplified by the amplifier 44 and transferred to the light receiving change-over device 45.

The light receiving change-over device 45 determines which of the first light source 31 and the second light source 32 has been activated and, based on this determination, supplies the light receiving signal to a first arithmetic circuit 46 or a second arithmetic circuit 47.

Based on this light receiving signal, these first and second arithmetic circuits 46, 47 calculate said luminances $B_1$, $B_2$, respectively, and transfer respective results to a processor 48 so that the luminance ratio $B_2/B_1$ in the equation (6) may be calculated.

The distance D to be gauged is calculated from this luminance ratio $B_2/B_1$ and output from an output terminal 49. Instead of calculating the distance D in said processor 48, the signal may be digitalized and arithmetically processed by a microcomputer.

While the light projected from the first light source 31 is directed immediately to the object 35 in this embodiment, it is also possible to place a mirror or the like in the optical path of the first light source 31 to bend the optical path for certain designing reasons, so far as there is established the preveiously mentioned optical path length difference d between the first light source 31 and the second light source 32.

To exclude any adverse affection of ambient light, the light projection from the light sources 31, 32 preferably occurs in pulse mode and such pulse mode light projection will be effectively dealt with by a differentiator included in the amplifier 44.

Figure 12:
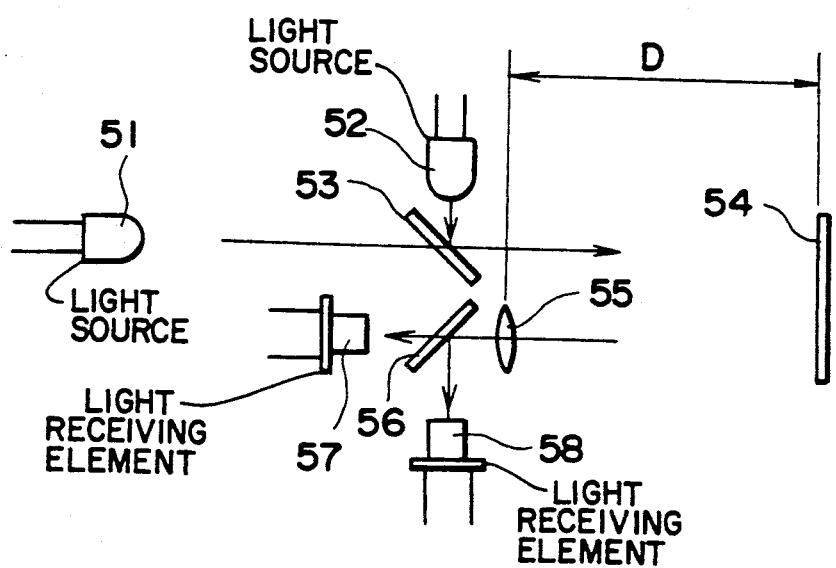

A variant of the instant embodiment is shown in FIG. 12. The variant employs, as the light projecting means, first and second light sources 51, 52 respectively having different wavelengths. Between these light sources and an object 54 to be gauged there is provided a dichroic mirror 53 adapted to transmit or reflect the light selectively depending on the wavelength thereof. Specifically, the dichroic mirror 53 transmits the light coming from the first light source 51 but reflects the light coming from the second light source 52 so that the light coming from both the first light source 51 and the second light source 52 illuminates the object 54 lying at a distance D as viewed in FIG. 12.

In this variant, the optical path length difference d between the pair of light sources corresponds to a difference between the distance from the first light source 51 to the dichroic mirror 53 and the distance from the second light source 52 to the dichroic mirror 53.

The light reflected on the object 54 is condensed by a light receiving lens 55 and then separated by a dichroic mirror 56 into two light components according to the wavelengths. More specifically, the light coming from the first light source 51 is transmitted by the dichroic mirrors 53, 56 and then received by a first light receiving element 57 while the light coming from the second light source 52 is reflected by the dichroic mirror 53, 56 and then received by a second light receiving element 58.

The light receiving elements 57, 58 generate light receiving signals which are amplified, compared with each other and reflated to the distance D to be gauged, prior to being output.

With such modified embodiment, no alternate activation of the light sources 51, 52 and therefore no alternate processing of the light receiving signals is required, because the light sources 51, 52 are of the wavelengths different from each other.

If the ambient light inevitably affects the reflected light coming from the object 54, the light sources 51, 52 may be activated so as to project the illumination light in pulse mode and the output signals of the light receiving elements 57, 58 may be taken out through a suitable differentiator. In this way, the adverse affection of the ambient light can be effectively excluded.

While this variant employs the dichroic mirrors 53, 56 in order to divide the light in accordance with the wavelengths, these dichroic mirrors 53, 56 may be replaced by suitable optical elements having polarizing ability to divide the light in two directions of polarization.

A third embodiment of the invention will be described.

Figure 13:
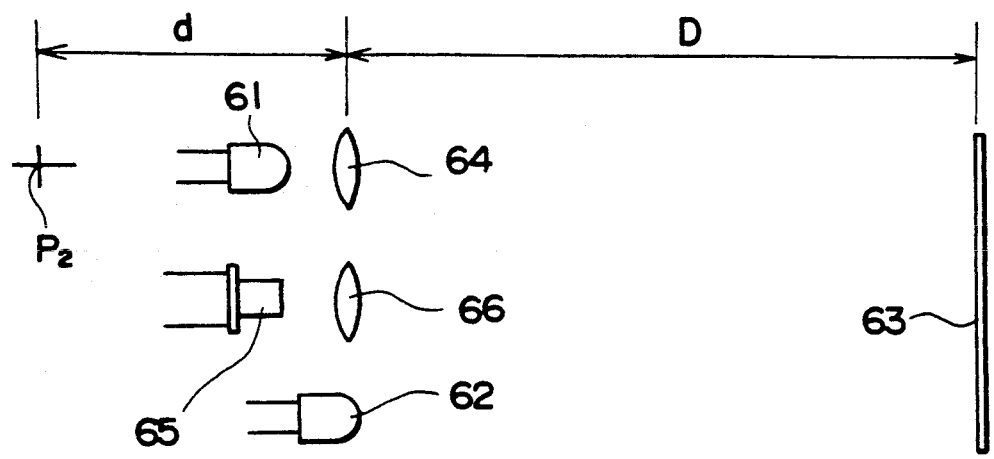

FIG. 13 is a schematic optical system diagram illustrating the optical system used for this embodiment, including a pair of light sources 61, 623 such as LEDs to illuminate an object 63 to be gauged having diffusive reflection surfaces. In front of the first light source 61 there is provided a light projecting lens 64 through which the light coming from the first light source 61 illuminates the object 63 while the light coming from the second light source 62 directly illuminates the object 63. Reference numeral 65 designates a light receiving element in from of which there is provided a light receiving lens 66.

The light projected by the light sources 61. 62 and reflected on the object 63 is condensed by the light receiving lens 66 before its incidence on the light receiving element 65.

The second light source 62, the light projecting lens 64 and the light receiving lens 66 are located at a distance D from the object 63.

Figure 15:
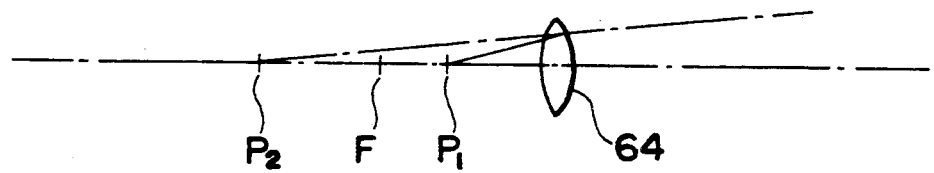

FIG. 15 illustrates a specific relationship between the first light source 61 and the light projecting lens 64 having a focal distance indicated by F. Assumed that the first light source 61 is at a distance $P_1$ from the projecting lens 64 and a light image of said first light source 61 is focussed at a distance $P_2$ from said light projecting lens 64 as illustrated in FIG. 15, these factors are correlated by a general equation for optical lens as follows:

$$1/F = (1/P_1) + (1/P_2) \qquad (7)$$

From the equation (7), $$1/P_2 = (1/F) - (1/P_1) \qquad (8)$$

The preselected condition of $F > P_1$ leads to a condition of $1/P_2 < 0$, indicating that $P_2$ is a virtual image point at the $P_1$ side. Additionally, the condition of $1/F > 0$ leads to a condition of $|P_2| > |P_1|$, indicating that, when the light coming from the first light source 61 located at $P_1$ is directed through the light projecting lens 64 to the object 63, this light source should have the same emanating characteristic as when located at $P_2$.

Said virtual image point is indicated by $P_2$ and a distance to this virtual image point is indicated by d in FIG. 13.

Now a principle on the basis of which the distance D to the object 63 is calculated will be described.

An illuminance $E_{21}$ of the light projected from the first light source 61 onto the object 63 is expressed by an equation $$E_{21} = I_{21}/(D+d)^2 \qquad (9)$$

where $I_{21}$ represents an emanating power of the first light source 61 located at the point $P_2$, because the virtual image of the first light source 61 is formed by the light projecting lens 64 on the point $P_2$. And the object 63 will have a luminance $B_{21}$ which is proportional to $\rho E_{21}$ where $\rho$ represents a reflection factor of the object 63. Namely, $$B_{21} = k\rho E_{21} \qquad (10)$$
$$= k\rho \{I_{21}/(D+d)^2\}$$

where k represents a constant and this constant will be equal to $1/1\pi$ if the object has its reflecting surface defined by a perfect diffusive surface. A relationship established between the luminance $B_{21}$ and the distance D expressed by the equation (10) is similar to the previously mentioned relationship represented by the curve 36 in FIG. 11.

An illuminance $E_{22}$ of the light projected from the second light source 62 onto the object 63 is expressed by an equation $$E_{22} = I_{22}/D^2 \qquad (11)$$

where $I_{22}$ represents an emanating power of the second light source 62. And a luminance $B_{22}$ of the object 63 is given by an equation $$B_{22} = k\rho E_{22} \qquad (12)$$
$$= k\rho I_{22}/D^2$$

A relationship established between the luminance $B_{22}$ and the distance D expressed by the equation (12) corresponds to the previously mentioned curve 37 in FIG. 11.

A ratio of the luminances $B_{21}$ and $B_{22}$ is given by $$\frac{B_{22}}{B_{21}} = \frac{k\rho I_{22}/D^2}{k\rho \{I_{21}/(D+d)^2\}} \qquad (13)$$
$$= K_1 \frac{(D+d)^2}{D^2}$$

where $K_1 = I_{22}I_{21}$.

The distance D can be obtained mereby calculating the ratio of the luminance $B_{22}$ to the luminance $B_{21}$ because both $K_1$ and d are constants in the above equation (13). Furthermore, the value of D can be obtained independently of the reflection factor of the object 63. It should be understood here that a signal processor to calculate the distance D may be of the same arrangement as the signal processor (FIG. 10) in the second embodiment.

If it is required only to determine whether the object 63 is at a distance longer or shorter than a predetermined distance, a variable C corresponding to this distance may be introduced and thereby it may be determined which of $CB_{21}$ and $B_{22}$ is larger than the other, similarly as in the second embodiment.

Figure 14:
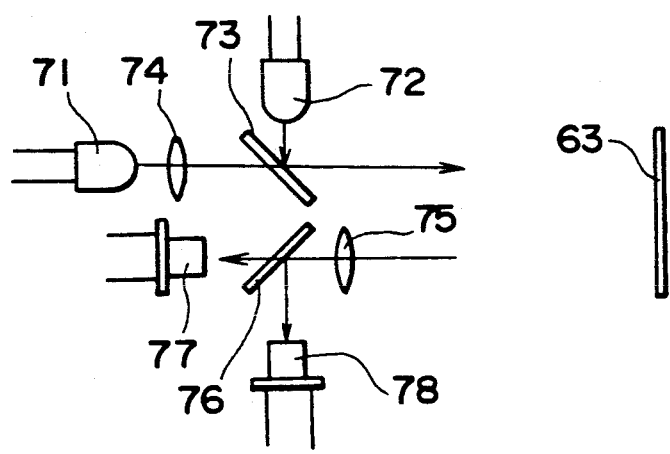

FIG. 14 shows a variant of the said third embodiment employing a pair of light sources 71, 72 respectively of different wavelengths. Reference numeral 73 designates a dichroic mirror adapted for transmission or reflection of a light selectively depending on the wavelength. In this variant, the dichroic mirror 73, as shown, reflects the light coming from the second light source 72 onto the object 63 and transmits the light coming from the first light source 71.

There is provided a light projecting lens 74 in front of the first light source 71 and, according to the principle as shown by FIG. 15, the light having been transmitted by said light projecting lens 74 exhibits an emanating characteristic as if projected from the virtual image point.

The light reflected on the object 63 is transmitted by a light projecting lens 75 and then directed onto a dichroic mirror 76 adapted for transmission or reflection of a light selectively depending on the wavelength. The light having been transmitted by this dichroic mirror 76 is received by a light receiving element 77 comprising a photodiode or the like while the light having been reflected on the dichroic mirror 76 is received by a light receiving element 78 also comprising a photodiode or the like.

Output signals having photoelectrically converted by these light receiving elements 77, 78 are respectively amplified and then subjected to operation of comparison. In this way, the left side of said equation (13), i.e., $B_{22}/B_{21}$ is calculated and thereby the distance D to the object 63 is determined.

With this variant, neither alternate activation of the light sources 71, 72 nor alternate processing of the light receiving signals is required, because the light sources 71, 72 are of the wavelengths different from each other.

If the ambient light inevitably affects the reflected light coming from the object 63, the light sources 71, 72 may be activated so as to project the light in pulse mode and the output signals of the light receiving elements 77, 78 may be taken out through a suitable differentiator. In this manner, the adverse affection of the ambient light can be effectively excluded.

Though the third embodiment has been described above as one of two light sources 61, 62, (71, 72) is associated with the light projecting lens 64 (74), it is also possible to associate both the light sources 61, 62 (71, 72) with the respective light projecting lenses. In this case it will be preferable to use the respective light projecting lenses which are considered to be optimal for a particular range of distance to be gauged and a particular environment in which the gauging is to be made.

The first, second and third embodiments each employing the first light source and the second light source encounter a problem when the intensities of the light by these light sources vary at different rates, respectively, due to various causes such as deterioration thereof. No problem occurs so far as the intensities of the light projected by the first light source and the second light source vary at a same rate, but variation of said intensities at different rates will cause a false result of gauging.

Fourth and fifth embodiments of the invention as will be described solve such problem.

Figure 16:
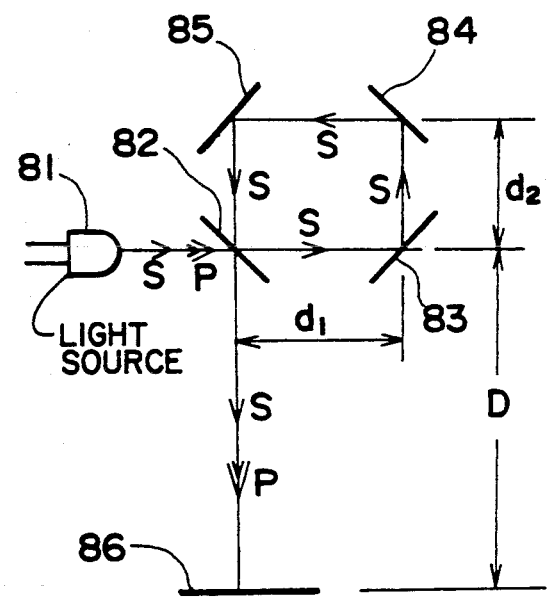

FIG. 16 shows the light projecting means used in the fourth embodiment including a light source 81 comprising a light emitting diode or the like, a polarizing beam splitter 82 and total reflection mirrors 83, 84, 85. Reference numeral 86 designates an object to be gauged.

The light emitted from the light source 81 is split by the polarizing beam splitter 82 into polarized light components P and S. Specifically, the polarized light component P is reflected by this splitter 82 toward the object 86 while the polarized light component S is transmitted by this splitter 82, then successively reflected on the total reflection mirrors 83, 84, 85, thereafter transmitted by said splitter 82 again and directed to the object 86.

Consequently, an optical path length of the polarized light component S from the light source 81 to the object 86 is longer than the corresponding optical path length of the polarized light component P by $2d_1 + 2d_2$.

A luminance on the object 86 as being illuminated by the polarized light component P split in the manner as has been described corresponds to the previously mentioned curve 37 in FIG. 11 while a luminance on the object 86 as being illuminated by the polarized light component S corresponds to the curve 36 in the same figure.

The object 86 is thus illuminated according to such luminance characteristics. In other words, the luminances (nits) of the object 86 correspond to $\rho Ep$ and $\rho Es$, respectively, where $\rho$ represents a reflection factor of the object 86, Ep represents an illuminance of the polarized light component P on the object 86 and Es represents an illuminance of the polarized light component S on the object 86.

Ratio of these two luminances Bp, Bs on the object 86 is expressed as follows:

$$Bp/Bs \propto Ep/Es \qquad (14)$$

Therefore, the distance D to the object 86 can be calculated regardless the reflection factor $\rho$ of the object 86 by detecting the luminance Bp, Bs.

Referring to FIG. 16, a distance from the light source 81 to the polarizing beam splitter 82 could be shortened substantially to zero with respect to the distance D to the object 86. Assumed that said distance is zero, the illuminance of the polarized light component P on the object 86 is expressed by $Ep = 1/D^2$ while the illuminance of the polarized light component S on the object 86 is expressed by $Es = 1/(D+d)^2$, where the intensity of the light emitted by the light source 81 is 1 and $d = 2d_1 + 2d_2$.

Ratio Ep to Es is given as follows:

$$Ep/Es = \{D/(D/(D+d)\}^2 \qquad (15)$$

The distance D to the object 86 can be determined by calculating D from the above equation (15).

FIG. 17 shows a variant of the light projecting means used in this fourth embodiment.

As illustrated, the light emitted from the light source 81 is directed by a double refractive optical element 87 onto the object 86.

Said optical element 87 has different refractive indices depending on the polarizing direction. Optical path lengths of the polarized light components P and S correspond to npl and nsl, respectively, where l represents a length of the optical element 87, np represents a refraction index for the polarized light component P and ns represents a refraction index for the polarized light component S.

In a consequence, there occurs a situation that the polarized light components P and S have their common light source 81 at optically different positions and therefore offer different illuminances on the object 86. Namely, such light projecting means presents an illuminance characteristic similar to the illuminance characteristic as illustrated in FIG. 11.

Accordingly, the distance D to the object 86 can be calculated by separately detecting the luminances on the object 86 which are due to the polarized light components P and S, respectively.

FIG. 18 shows the light receiving means used to detect the luminances on the object 86.

As shown, the light reflected on the object 86 comprising a mixture of the polarized light components P and S is condensed by a condenser 88 and then incident on a polarizing beam splitter 89. The polarized light component P is reflected by this splitter 89 toward on light receiving element 90 while the polarized light component S is transmitted by this splitter 89 and incident on the other light receiving element 91, and the polarized light components P and S are photoelectrically converted by these light receiving elements 90, 91, respectively.

FIG. 19 shows a variant of the light receiving means employing a pair of polarizing filters 92P, 92S on which the light comprising a mixture of the polarized light components P, S and reflected on the object 86 is incident.

The polarizing filter 92P transmits only the polarized light component P which is then directed through a condenser 93P to the light receiving element 90.

Similarly, the polarizing filter 92S transmits only the polarized light component S which is then directed through a condenser 93S to the light receiving element 91.

In this manner, the polarized light components P, S are photoelectrically converted by the respective light receiving elements 90, 91 which then output photoelectric current Ip, Is, respectively. Accordingly, the distance D can be calculated by a signal processor similar to the already mentioned signal processor of FIG. 5.

In the fourth embodiment as has been described above, the signal processor is not limited to the arrangement of FIG. 5 but further various arrangements may be adopted such that the photoelectric signal is A/D converted to process the signal in digitalized fashion or the signal processing is performed by a divider.

The light source 81 preferably emits pulsated or modulated light in order to exclude an influence of the ambient light.

When a light source having a wide range of wavelength is employed, the light emitted by such light source may be split into components of different wavelengths for projection. In this case, the polarizing beam splitter 82, 89 are replaced by dichroic mirrors and the polarizing filters 92P, 92S are also replaced by dichroic mirrors or the like.

Now a fifth embodiment of the invention will be described.

Figure 20:
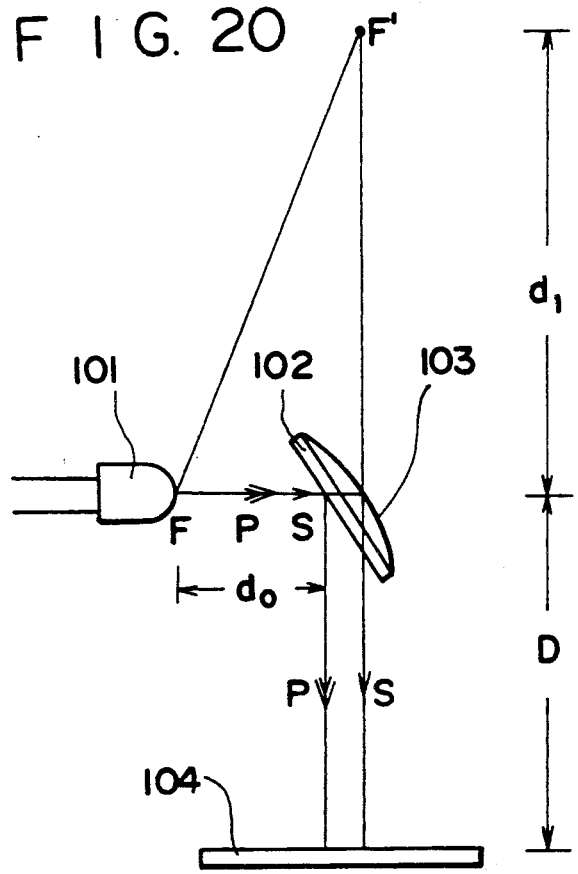

FIG. 20 shows light projecting means comprising a light source 101 such as a light emitting diode, a polarizing beam splitter 102, a hyperboloidal mirror 103 and an object 104 to be gauged.

The light emitted from the light source 101 is split by the polarizing beam splitter 102 into polarized light components P and S. Specifically, the polarized light component P is reflected by this splitter 102 toward the object 104 while the polarized light component S is transmitted by this splitter 102, then reflected by the hyperboloidal mirror 103 and transmitted again by said splitter 102 to be projected onto the object 104.

Since the light source 101 is located at the focus F of the hyperboloidal mirror 103, the polarized light component S having been transmitted by the splitter 102 can be regarded as if projected from a light source located at another focus F'.

A relationship between the hyperboloidal mirror 103 and said focus F' will be described in reference with FIG. 21.

Figure 21:
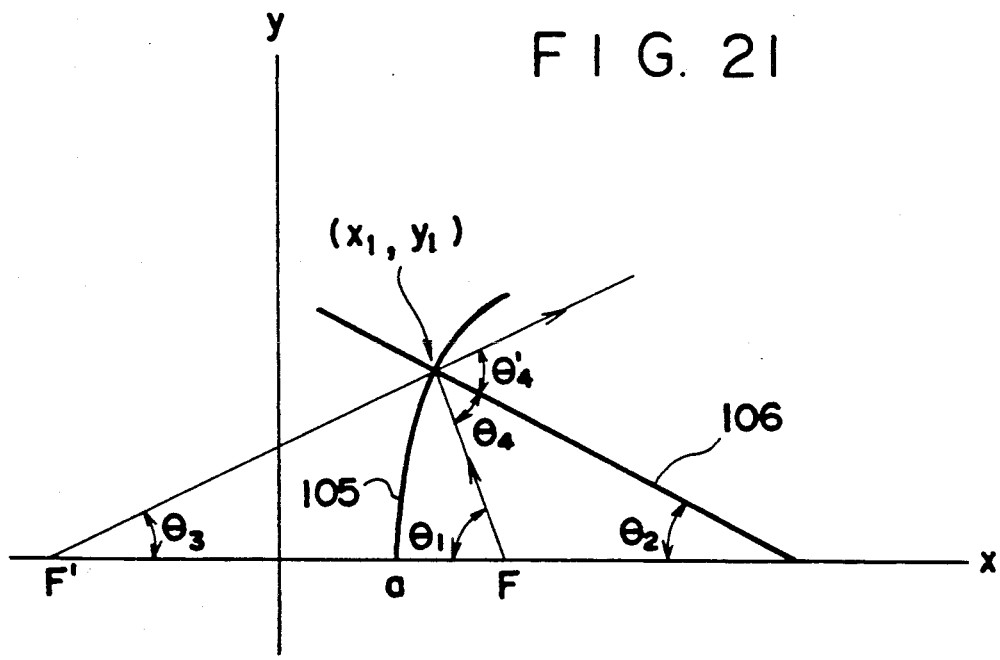

Referring to FIG. 21, reference numeral 105 designates a hyperboloid and a locus surface formed by rotating this hyperboloid 105 around the x-axis corresponds to a reflecting surface of the hyperboloidal mirror 103.

As well known, the hyperboloid is expressed by $$\frac{x^2}{a^2} - \frac{y^2}{b^2} = 1 \qquad (20)$$

A normal line on a point $x_1$, $y_1$ of this hyperboloid 105 is given by $$\frac{x_1^2}{a^2}(y - y_1) - \frac{y_1^2}{b^2}(x - x_1) = 0 \qquad (21)$$

Focuses F, F' of the hyperboloid 105 are given by $$F = \sqrt{a^2 + b^2} \qquad (22)$$

-continued $$F = -\sqrt{a^2 + b^2} \qquad (23)$$

Respective angles $\theta_1$, $\theta_2$, $\theta_3$ are set as shown. $\theta_4$ designates an angle defined by a line connecting the focus F to one point ($x_1$, $Y_1$) with the normal line 106 and $\theta_4'$ designates an angle defined by a line connecting the focus F' to said one point ($x_1$, $y_1$) with the normal line 106.

$\theta_4$ will correspond to the incident angle of the light when the light source 101 is placed at the focus F and therefore $\theta_4 = \theta_4'$ if $\theta_4'$ is a reflection angle. As for the polarized light component S, this corresponds to the case in which the light source lies at the focus R''.

Now the condition of $\theta_4 = \theta_4'$ will be described in more details.

An equation of the hyperboloid 105 at the one point ($x_1$, $y_1$) is introduced from the above equation (20) as follows:

$$\frac{x_1^2}{a^2} - \frac{y_1^2}{b^2} = 1 \qquad (24)$$

And an equation of the normal line 106 at $x_1$, $y_1$ is also introduced from the above equation (21) as follows:

$$y = \frac{a^2 y_1}{b^2 x_1} x + y_1 \left( \frac{a^2}{b^2} + 1 \right) \qquad (25)$$

concerning the focuses F, F', the equations (22), (23) introduce $$F^2 = a^2 + b^2 \qquad (26)$$

and the equation (24) introduces $$a^2 y_1^2 = b^2 (x_1^2 - a^2) \qquad (27)$$

As seen in FIG. 21,
$$\theta_1 = \theta_2 + \theta_4, \theta_4 = \theta_1 - \theta_2 \qquad (28)$$

$$\theta_{440} = \theta_2 + \theta_3 \qquad (29)$$

When the both sides of the above equation (28) are expressed in tan, $$\tan \theta_4 = \tan(\theta_1 - \theta_2) \qquad (30)$$

The right side of this equation (30) can be rewritten as following:

$$\tan(\theta_1 - \theta_2) = \frac{\tan \theta_1 - \tan \theta_2}{1 + \tan \theta_1 \tan \theta_2} \qquad (31)$$

As will be apparent in FIG. 21, $$\tan \theta_1 = \frac{y_1}{F - x_1} \qquad (32)$$

From the above equation (25)

$$\tan \theta_2 = \frac{a^2 y_1}{b^2 x_1} \qquad (33)$$

Substitution of the above equations (30), (32), (33) into the equation (31) leads to $$\tan\theta_4 = \left\{\frac{b^2 x_1 y_1 - a^2 y_1(F - x_1)}{b^2 x_1(F - x_1)}\right\} / \left\{\frac{b^2 x(F - x_1) + a^2 y_1^2}{b^2 x_1(F - x_1)}\right\}$$

by substituting the above equation (27) and rearranging, $$= \frac{x_1 y_1(a^2 + b^2) - a^2 y_1 F}{b^2\{x_1(F - x_1) + (x_1^2 - a^2)\}}$$

by substituting the above equation (26) and rearranging, $$= \frac{y_1 F(x_1 F - a^2)}{b^2(x_1 F - a^2)} = \frac{y_1 F}{b^2} \quad (34)$$

Therefore, $$\theta_4 = \tan^{-1}\frac{y_1 F}{b^2} \quad (35)$$

Now the both sides of the above equation (29) are expressed in tan. Namely, $$\tan\theta_4 = \tan(\theta_2 + \theta_3) \quad (36)$$

The right side of this equation (36) is given by $$\tan(\theta_2 + \theta_3) = \frac{\tan\theta_2 + \tan\theta_3}{1 - \tan\theta_2 \tan\theta_3} \quad (37)$$

From FIG. 21

$$\tan\theta_3 = \frac{y_1}{F + x_1} \quad (38)$$

Substitution of the above equations (34), (36), (38) into the above equation (37) brings about $$\tan\theta_4' = \left\{\frac{b^2 x_1 y_1 + a^2 y_1(F + x_1)}{b^2 x_1(F + x_1)}\right\} / \left\{\frac{b^2 x(F + x_1) - a^2 y_1^2}{b^2 x_1(F + x_1)}\right\}$$

by substituting the above equation (27) and rearranging, $$= \frac{x_1 y_1(a^2 + b^2) + a^2 y_1 F}{b^2\{x_1(F + x_1) - (x_1^2 - a^2)\}}$$

and by substituting the above equation (26) and rearranging, $$= \frac{y_1 F(x_1 F + a^2)}{b^2(x_1 F + a^2)} = \frac{y_1 F}{b^2} \quad (39)$$

Therefore $$\theta_4' = \tan^{-1}\frac{y_1 F}{b^2} \quad (40)$$

In conclusion, the above equations (35), (40) lead to $\theta_4 = \theta_4'$.

It will be appreciated from the foregoing description that the light coming from the focus F is incident on the one point $(x_1, y_1)$ at the incident angle $\theta_4$ and reflected thereon at the reflection angle $\theta_4'$.

A direction of the reflected light coincides with the direction of the light coming from the focus F'.

Consequently, the polarized light component S projected from the light source 101 in FIG. 20 behaves as projected from an imaginary light source placed at the focus F' and thus exhibit an illuminance characteristic different from that of the polarized light component P. Specifically, the polarized light component P directed to the object 104 has an optical path length of do+D while the polarized light component S has an optical path length of $d_1$+D. In view of a fact that the distance do from the light source 101 to the polarizing beam splitter 102 can be shortened substantially to zero, it is now assumed that said distance do is zero. On this assumption, the polarized light component T will have an optical path longer than that of the polarized light component P by an amount of $d_1$.

In this manner, both the polarized light components P and S have their optical characteristics varying as their respective light projection distances vary. As a result, the luminance characteristic on the object 104 due to the polarized light component P corresponds to the curve 37 in FIG. 11 while the luminance characteristic on the same object 104 due to the polarized light component S corresponds to the curve 36 in the same figure.

Accordingly, the illuminance Ep of the polarized light component P on the object 104 is given by an equation Ep Ip/$D^2$ where Ip represents an effective emanating power of the polarized light component P with the reflection factor of the like of the polarizing beam splitter 102 taken in account and the object 104 has an luminance Bp proportional to $\rho$Ep where $\rho$ represents factors of the object 104, for example, reflection factor and diffusion factor, as expressed by $$Bp = \rho Ep = \rho Ip/D^2.$$

Similarly, the illuminance Es of the polarized light component S on the object 104 is given by an equation $Es = Is/(D+d_1)^2$ where Is represents an effective emanating power of the polarized light component S and the object 104 has a luminance Bs proportional to $\rho$Es where $\rho$ represents factors of the object 104, for example, reflection factor and diffusion factor, as expressed by $$Bs = \rho Es = \rho Is/(D+d_1)^2.$$

Now the ratio of Bp to Bs is determined by $$\frac{Bp}{Bs} \quad \frac{Ip(D + d_1)^2}{I_s D^2}.$$

Since Ip/Is is a constant, the distance D to the object 104 can be calculated based on this ratio Bp/Bs.

Figure 22:
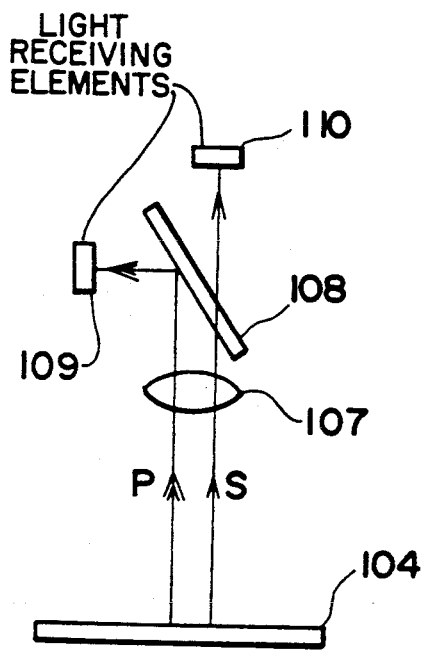

FIG. 22 shows the light receiving means used to detect a luminance on the object 104. As shown, the reflection light on the object 104 which have been split into the polarized light components P and S and projected onto the object 104 is condensed by a condenser 107 and incident on a polarizing beam splitter 108. The polarized light component P is reflected by this beam splitter 108 and incident on one light receiving element 109 while the polarized light component S is transmitted by this splitter 108 and incident on another light receiving element 110 so that the polarized light components P, S are photoelectrically converted by these light receiving elements 109, 110, respectively. The luminance on the object is determined by a signal processor similar to the signal processor illustrated in FIG. 5 and the distance D is calculated from this value of luminance.

Figure 23:
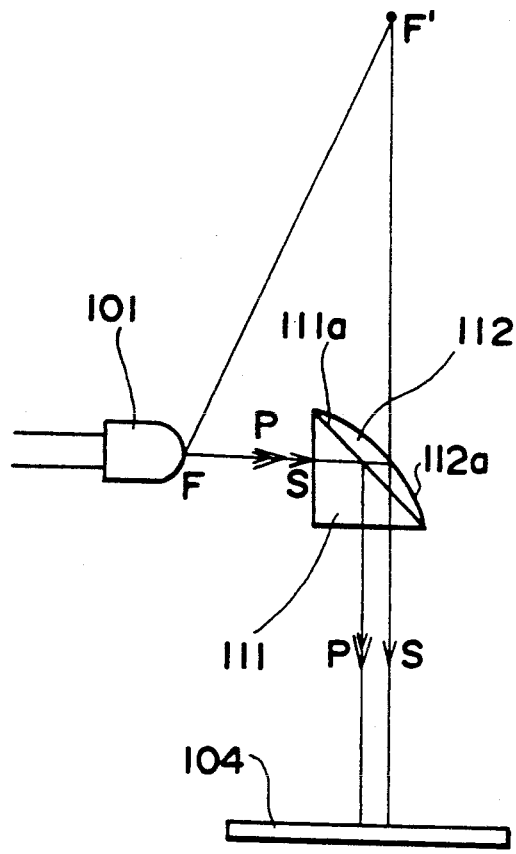
Figure 24:
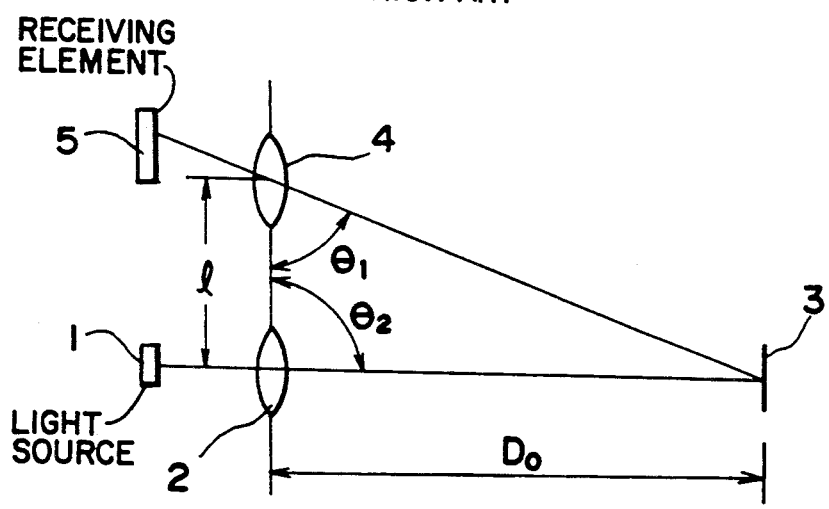
FIGS. 24 and 25 are diagrams schematically showing two embodiments of gauging apparatus according to the prior art.
Figure 25:
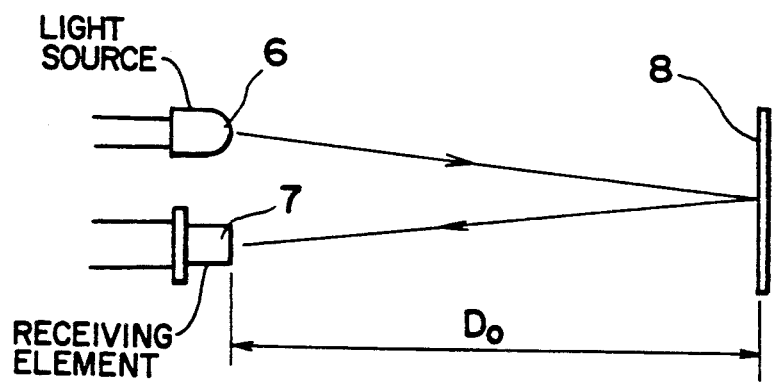

FIG. 23 shows a variant of the light projecting means employing a rectangular prism 111 instead of the polarizing beam splitter 102. A slanting surface 111a of the rectangular prism 111 is provided with a reflection film for the polarizing beam splitter and a plane-convex lens 112 fixed thereon. Reference numeral 112a designates a total reflection mirror defined by as hyperboloidal surface.

Light coming from the source 101 is split by the rectangular prism 111 into polarized light components P and S. More specifically, the polarized light component P is reflected on the reflection film provided on the slanting surface 111a and incident on the object 104 while the polarized light component S is transmitted by the rectangular prism 111, then reflected by the total reflection mirror 112a and transmitted again by said rectangular prism 111 before its incidence on the object 104. Since the total reflection mirror 112a is defined by the hyperboloidal surface, the light component transmitted by the rectangular prism 111 can be regarded as if projected from an imaginary light source placed at the focus F'.

It should be understood here that the reflection surface on which the polarized light component S is reflected is not limited to said hyperboloidal one but concave type mirror such as spheric or paraboloidal mirror may be also employed so far as one of the divided light components can be reflected by such concave mirror and have an emanating characteristic different from that of the other light component.

While the invention has been described by way of example, the light receiving means is not limited to the arrangement adapted to receive the reflection light coming from the object to be gauged as in the above-mentioned embodiments and may be also arranged so that such light receiving means is provided integrally with the object and directly receives the polarized light components P, S.

The light source 101 may be activated so as to project pulsated or modulated light in order to exclude an influence of the ambient light also in the fifth embodiment.

The signal processor is not limited to the arrangement of FIG. 5 which is adapted to log-convert the photoelectric signal coming from the light receiving means but it is also possible to employ an arrangement adapted to A/D coonvert the photoelectric signal for digital procession or an arrangement adapted to perform a desired signal processing by a divider.

What is claimed is:

1. Optical gauging apparatus comprising light projecting means adapted to illuminate an object to be gauged using first and second light sources so that a luminance on the object under illumination by the first light source differs from a luminance on the object under illumination by the second light source; light receiving means adapted to receive and photoelectrically convert the light projected from these two light sources separately for the respective light sources; and a signal processor adapted to calculate a ratio of luminances on the object caused by said first and second light sources, respectively, from output signals of said light receiving means and thereby to output an information on an amount of change occurring in the object or a distance thereto.

2. Optical gauging apparatus as recited in claim 1, wherein said light projecting means comprises first and second light sources having different light emitting surfaces.

3. Optical gauging apparatus as recited in claim 1, wherein said light projecting means comprises a first light source having a wide projecting angle and a second light source having a narrow projecting angle.

4. Optical gauging apparatus as recited in claim 1, wherein said light projecting means comprises first and second light sources adapted to illuminate the object with different optical path lengths.

5. Optical gauging apparatus as recited in claim 1, wherein said light projecting means comprises first and second light sources of which at least one is associated with a lens.

6. Optical gauging apparatus comprising light projecting means adapted to split the light coming from a single light source into two light components of different optical characteristics and to illuminate an object to be gauged with said two light components of optical path length being different from each other; light receiving means adapted to receive and photoelectrically convert the light reflected on the object separately for the respective light components; and a signal processor adapted to compare photoelectric conversion signals for the respective light components output from said light receiving means and thereby to output an information on an amount of change occurring in the object or a distance thereto.

7. Optical gauging apparatus as recited in claim 6, wherein, after the light coming from the single light source is split into two light components having different characteristics, one of said light components is successively reflected on a plurality of mirrors to establish an optical path length difference between said two light components.

8. Optical gauging apparatus as recited in claim 6, wherein the light coming from the single light source is projected through an optical element presenting different refraction indices depending on the polarizing direction.

9. Optical gauging apparatus as recited in claim 6, comprising light projecting means adapted to split the light coming from the single light source into two light components having different characteristics, to reflect the one light component on a concave mirror and to project this light component together with the other light component toward the object.

10. Optical gauging apparatus as recited in claim 1 or 6, wherein the light receiving means is provided integrally with the object.

* * * * *